United States Patent [19]
Yamagata et al.

[11] Patent Number: 5,239,966
[45] Date of Patent: Aug. 31, 1993

[54] ELECTRONIC CONTROL FUEL INJECTION APPARATUS FOR TWO-CYCLE ENGINE

[75] Inventors: Takashi Yamagata, Hamamatsu; Mitsuru Miyata; Tomoyuki Hirose, both of Isesaki, all of Japan

[73] Assignees: Suzuki Corporation, Hamamatsu; Japan Electronic Control Systems Co., Ltd., Isesaki, both of Japan

[21] Appl. No.: 838,520

[22] Filed: Feb. 20, 1992

[30] Foreign Application Priority Data

Feb. 20, 1991 [JP] Japan .................. 3-026253

[51] Int. Cl.⁵ .............................. F02D 41/12
[52] U.S. Cl. ........................ 123/493; 123/492
[58] Field of Search ..................... 123/493, 492

[56] References Cited
U.S. PATENT DOCUMENTS
4,452,212 6/1984 Takase ................... 123/493

FOREIGN PATENT DOCUMENTS
62-45950 2/1987 Japan.
63-29039 2/1988 Japan.
63-200646 12/1988 Japan.

Primary Examiner—Andrew M. Dolinar
Attorney, Agent, or Firm—Foley & Lardner

[57] ABSTRACT

An electronic control fuel injection apparatus for a crank chamber compression type 2-cycle engine which compensates a fuel injection amount predetermined by an opening degree of an engine intake air system and an engine speed in response to a fuel amount reduction rate allocated by using a opening degree of the engine intake air system and an engine speed if the engine speed enters an acceleration loss region during a predetermined deceleration and or re-acceleration of the engine while a deceleration of the engine is detected.

13 Claims, 6 Drawing Sheets

ELECTRONIC CONTROL FUEL INJECTION APPARATUS FOR TWO-CYCLE ENGINE

BACKGROUND OF THE INVENTION (1) Field of the Invention

This invention relates to an electronic control fuel injection apparatus for a 2-cycle engine, for operating the fuel injection amount in accordance with a degree of opening of a variably controlled engine air intake system and an engine speed, and in particular, relates to an electronic control fuel injection apparatus for a crank chamber compression type 2-cycle engine for operating the engine at a lower speed to thereby enhance the acceleration performance when the engine is accelerated again after the engine has been decelerated.

(2) Related Art of the Invention

Conventional electronic control fuel injection units for an engine are constituted by setting a fuel injection amount in response to a degree of opening of an engine air intake system, represented by the degree of opening of a throttle valve and an engine speed, to thereby drive and control the fuel injection valve in response to the fuel injection amount (see Japanese Unexamined Patent Publication (Kokai) 63-29039).

In general, a crank chamber of a crank chamber compression type 2-cycle engine is utilized as a type of reciprocating compressor, and is constituted such that the air-fuel mixture sucked into the crank chamber from the suction port is compressed by the reciprocating movement of a piston, and the air-fuel mixture compressed inside the crank chamber is made to flow into the cylinder, whereby a scavenging action occurs simultaneously with a flow of the air-fuel mixture.

In this type of the 2-cycle engine, an exhaust gas pulsation effect caused by a resonance of an exhaust system has a large influence on an air-intake efficiency, and therefore, a construction of the exhaust system has been improved in an attempt of upgrading the air-intake efficiency by utilizing the pulsation effect of the exhaust gas.

the pulsation effect of the exhaust gas can not be always obtained throughout the entire engine operating region, and in the engine operating region where little resonance is generated in the exhaust system, a required pulsation effect of the exhaust gas can not be obtained, and thus the desired enhancement of the air-intake efficiency can not be obtained.

For example, FIG. 6 shows the region where little resonance of the exhaust system is generated while the engine speed is reduced.

This graph uses the engine speed N and the degree $\alpha$ of opening of the throttle among engine operating conditions, and shows that the region X is determined by the N and $\alpha$ where little resonance of the exhaust system is generated, as shown by a shaded area enclosed by a dashed line.

Further, a solid line in FIG. 6 denotes characteristics occurring during a deceleration of the engine speed, and a dotted line indicates the characteristics occurring during an acceleration of the engine.

Note, the air intake volume during the deceleration differs from the air-intake volume during a steady operation in most engines, but in an engine having a fuel injection system whereby the fuel injection amount is set in response to the opening degree of the engine air intake system and the engine speed, as described above, the same amount of fuel is always injected 7hile the conditions of the opening degree and the engine speed remain unchanged, but if the fuel injection amount is set to an optimum level during the steady operation, an excessive amount of fuel is injected compared to the air intake volume during a deceleration, and thus the air/fuel ratio becomes excessively richer.

Furthermore, when the engine speed enters into the region X where little resonance of the exhaust system is generated during a deceleration of the engine, as shown by a solid line in FIG. 6, no improvement of the air intake efficiency can be obtained with a lower air intake volume, and thus the air/fuel ratio will be more excessively concentrated.

When the engine is again accelerated just after the completion of this deceleration of the engine, additional fuel will be injected into the engine. Since, in the reacceleration of the engine, a decrease of the air intake amount has occurred not because of the region where little resonance of the exhaust system is generated but because of a delay of the intake air to be sucked into the engine, the air/fuel ratio will be still excessively richer, which may finally sometimes lead to a misfiring in the engine, and a loss of acceleration.

The region X where little resonance of the exhaust system shown in FIG. 6 is generated will become a loss of acceleration region when the engine is reaccelerated after a deceleration thereof.

SUMMARY OF THE INVENTION

An object of the present invention is to solve these conventional problems by preventing an excessive richness of the air/fuel ratio, preventing a misfiring of the engine, and preventing any acceleration loss when the engine is reaccelerated after a deceleration thereof, in a crank chamber compression type 2-cycle engine in which the fuel injection amount can be set in response to the opening degree of the engine air intake system and the engine speed.

To achieve the above objects, when the engine enters into the acceleration loss region during a deceleration thereof, the present invention provides a stipulated ratio of a volume reduction compensation to the fuel injection amount preset and responsive to the opening degree of the engine air intake system and the engine speed, to thus optimize the fuel injection amount actually supplied to the engine when the engine is reaccelerated just after the deceleration thereof.

Concretely, the present invention provides an electronic control fuel injection apparatus for a crank chamber compression type 2-cycle engine, characterized in that the apparatus is constituted as shown in FIG. 1 and comprises: a fuel injection valve, air intake volume control means for variably controlling a degree $\alpha$ of an opening of an air intake system of the engine, detection means for detecting engine operating conditions including an engine speed N and the opening degree $\alpha$ which is controlled by the air intake volume control means, computing means for computing a deceleration rate $\Delta N$, the engine speed N and a reduction rate $\Delta \alpha$ of the opening degree $\alpha$, first determination means for determining an engine deceleration state in response to the two rates $\Delta \alpha$ and $\Delta N$, second determination means for determining whether or not the engine operating state is within an acceleration loss region X during the deceleration of the engine speed, which region is predetermined in response to the engine operating conditions during the determination of the deceleration of the engine, first setting means for setting a standard fuel injection amount $T_I$ in response to the detected engine speed N and the opening degree $\alpha$ of the air intake system, second setting means for setting a reduction rate $BOG_{LI}$ of the fuel amount in response to the detected engine speed N and the opening degree $\alpha$ when the engine is determined to be in a deceleration state by the first determination means, and when the engine operating condition is determined to be within the acceleration loss region X by the second determination means, third setting means for setting a fuel injection amount for a deceleration of the engine by correcting the standard fuel injection amount $T_I$ set by the first setting means in response to the reduction rate $BOG_{LI}$ of the fuel amount set by the second setting means, and fuel injection control means for driving and controlling the fuel injection valve in response to the fuel injection amount set by the first setting means or the third setting means.

According to the present invention, when the engine enters into the acceleration loss region X while the engine deceleration determination is made in response to the engine speed deceleration rate $\Delta N$ and to the opening degree reduction rate $\Delta\alpha$ of the engine air intake system, the fuel amount reduction ratio $BOG_{LI}$ allocated by the opening degree $\alpha$ of the engine air intake system and the engine speed N can be added to the fuel injection amount $T_I$ predetermined by the opening degree $\alpha$ and the engine speed N, and thus the fuel injection amount can be reduced for a compensation thereof.

Accordingly, because a reduced amount of fuel is injected with respect to the amount preset in response to the opening degree $\alpha$ of the engine air intake system and the engine speed N when the engine conditions enter into the acceleration loss region X while an engine deceleration determination is made, or under the state of a lower air intake volume during deceleration of the engine speed and excessive richer concentration of the air/fuel ratio and therefore misfiring of the engine can be also prevented, and an engine acceleration loss can be prevented during the reacceleration of the engine just after the deceleration thereof.

In this case, the air intake volume control means can be constituted of a throttle valve for variably controlling the degree of opening of the air intake passage.

The first setting means can be constituted by comprising memory means in which is stored the basic fuel injection amounts for respective engine operating regions pre-classified into a plurality of numbers responsive to the opening degree and the engine speed, retrieval means for retrieving the basic fuel injection amount in response to the actual opening degree of the engine air intake system and the engine speed, standard fuel injection amount setting means for setting the retrieved basic fuel injection amount as a standard fuel injection amount commonly applicable to the respective cylinders of the engine, and fuel injection amount computing means for providing a ratio of compensatory amounts in response to the engine computing conditions to the previously set standard fuel injection amount, and for obtaining the final fuel injection amount.

The first determination means may preferably be constituted in such a manner that it determines the engine speed deceleration state when both following conditions (C1) and (C2), have been satisfied in order.

(C1) (An opening degree $\alpha_{old}$ of the engine air intake system prior to a stipulated time—An updated opening degree $\alpha_{new}$ of the engine air intake system)>or=A predetermined constant reduction rate $\Delta\alpha$ in a value of the opening degree of the engine air intake system for determining an engine deceleration. This condition is for detecting an intention of a driver decelerating the engine speed through the air intake volume control means.

(C2) (An engine speed $N_{old}$ prior to a stipulated time—An updated engine speed $N_{new}$)>or=A predetermined first constant change in a value of the engine speed for determining an engine speed deceleration. This condition is for detecting the engine deceleration through a reduction of the actual engine speed which occurs after the opening degree has been changed to decrease.

The second determination means may preferably be constituted so that determining whether or not the following conditions in item (C3) are satisfied after satisfaction of the conditions in item (C1) then (C2).

(C3) When the engine speed N and the opening degree $\alpha$ of the engine air intake system are within an acceleration loss region X.

The fuel injection controlling for deceleration of the engine speed in accordance with the present invention may be preferably cancelled when the conditions of at least one of following items (D1) to (D2) are satisfied.

(D1) When the conditions of (The engine speed $N_{old}$ prior to the stipulated time—The updated engine speed $N_{new}$)>or=The first change in a constant value of the engine speed RDN1 for determining the deceleration of the engine speed have not been met within the stipulated period of time after the condition of item (C1) was satisfied.

(D2) When the conditions of (The engine speed $N_{OLD}$ prior to the stipulated time—The updated engine speed $N_{new}$)<or=The second change in a constant value of the second engine speed RDN2 for determining the deceleration of the engine speed has not been reached before the condition of item (C3) is satisfied and after the conditions of item (C2) were once satisfied.

(D3) When the engine conditions deviate from the acceleration loss region X after all of the conditions of items (C1), (C2) and (C3) were once satisfied.

(D4) When the conditions of (The opening degree $\alpha_{new}$ of the air intake system—The opening degree $\alpha_{old}$ of the air intake system prior to the stipulated time)->or=The constant opening degree RDASD of the engine air intake system for determining an engine acceleration are reached after all of the conditions in items (C1), (C2) and (C3) were once satisfied.

(D5) When the conditions of (The engine speed $N_{old}$ prior to the stipulated time—The updated engine speed $N_{new}$)<or=The third change in a constant value of the engine speed RDN3 for determining the deceleration of the engine speed are reached after all of the conditions in items (C1), (C2) and (C3) were once satisfied.

The conditions in items (D4) and (D5) determine the engine speed acceleration, and the compensation of the injection fuel for engine deceleration should be cancelled based on the determination of the engine speed acceleration.

The fuel reduction amount rate can be made a value quoted, with an addition of a compensation calculation, by a three-dimensional table by the opening degree of the engine air intake system and the engine speed.

The present invention is now explained in detail with reference to the embodiments shown in the drawings, to enable a clear understand of the present invention.

Note, the present invention is not limited by these embodiments but can be freely modified within the scope of the claims.

DETAILED DESCRIPTION OF THE PREFERRED EMBODIMENT

Figure 1:
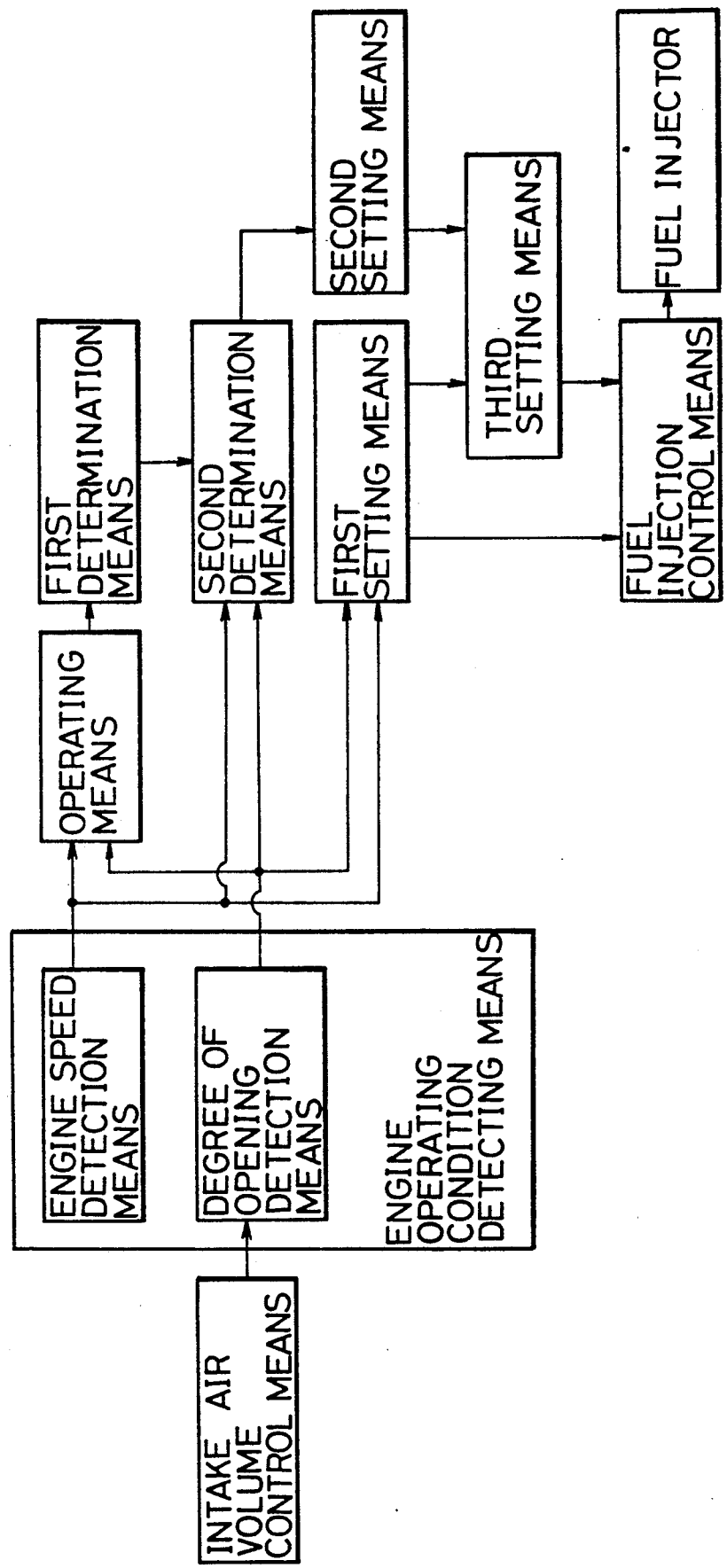
FIG. 1 is a block diagram showing the structure of this invention.
Figure 2:
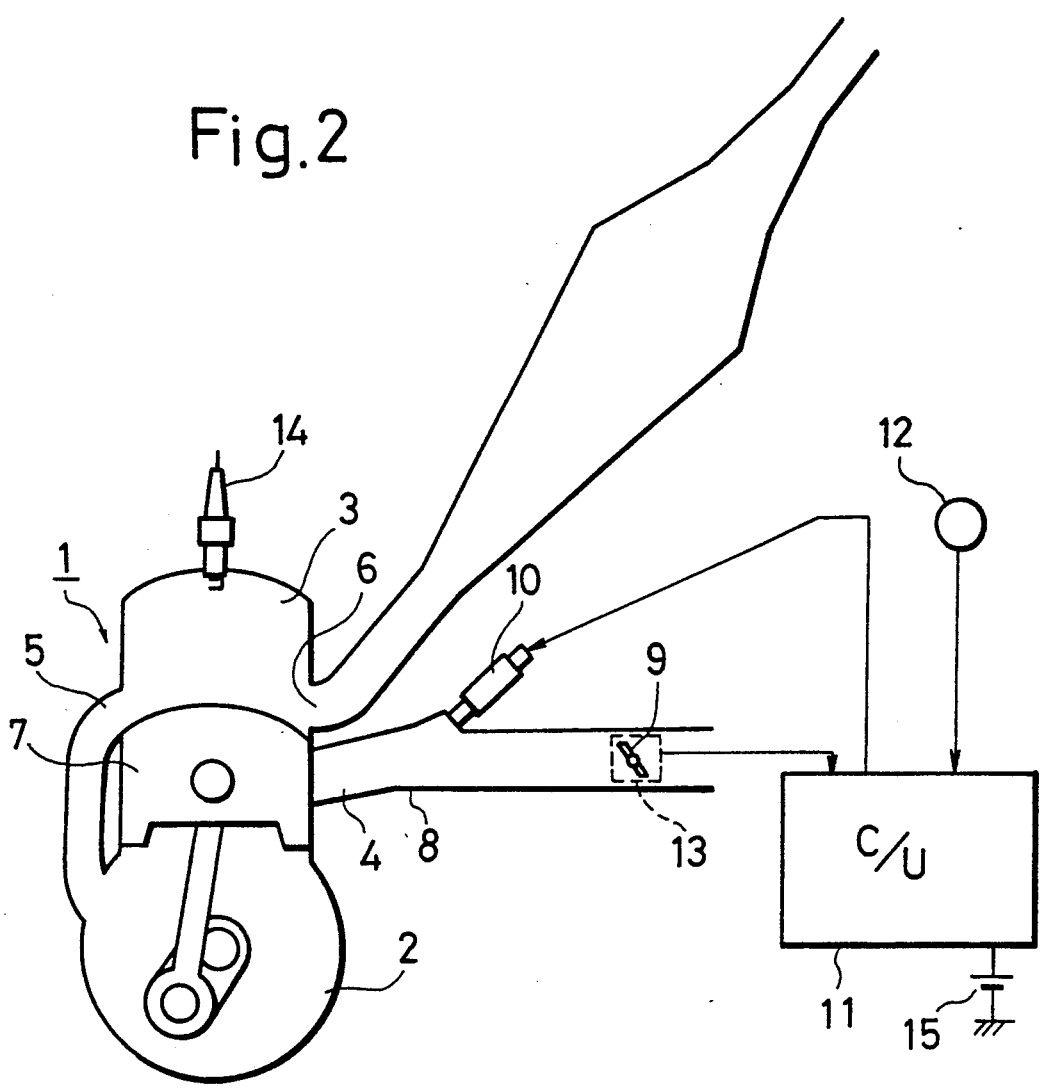
FIG. 2 is a schematic view showing an embodiment of the present invention.

FIG. 2 shows a crank chamber compression type 2-cycle engine using an electronic fuel injection system, as an embodiment according to the present invention.

In the Figure, an engine 1 has a structure such that a flow of an air-fuel mixture, which has been compressed inside a crank chamber 2, is introduced into a cylinder 3 for scavening.

An intake port 4, a scavenging port 5, and an exhaust port 6 are provided on the wall face of the cylinder 3, the air-fuel mixture is drawn through the intake port 4 into the crank chamber 2 by a low pressure generated when a piston 7 is at a top dead portion of a compression stroke thereof. The combusted gas inside the cylinder 3 is exhausted via the exhaust port 6 when the piston 7 passes down to expose the exhaust port 6. As the piston further descends, the scavenging port 5 is communicated with the crank chamber 2 and the air-fuel mixture compressed inside the crank chamber 2 flows into the cylinder 3 to scavenge the exhaust gas in the cylinder 3.

A throttle valve 9 for controlling the intake air flow rate or amount by variably controlling an opening degree of the intake air passage is provided at the merging portion of intake air manifolds 8 communicated with the air intake port 4.

A fuel injection valve 10 is provided for each of the cylinders (2 cylinders #1 and #2 in the present embodiment) at the respective intake air manifold downstream of the throttle valve 9. Each fuel injection valve 10 is an electromagnetic system fuel injector which can be opened when an elective current is applied to a solenoid thereof and closed when the current flow is stopped. The fuel injector is opened when the solenoid is activated by a driving pulse signal output from a control unit 11, and thus fuel fed under pressure from a fuel pump not shown in the drawing. The pressure is adjusted to a required pressure by a pressure regulator and is injected to the engine 1.

The fuel is injected into the intake air flow from the fuel injection valve 10 so that the air-fuel mixture is formed and then sucked into the crank chamber 2 from the intake port 4 when the piston is at a position passing over the port 4 during a compression stroke.

An ignition plug 14 is provided at each cylinder.

The control unit 11 receives signals from a variety of sensors, each of which actuates as engine operating condition detecting means. The unit 11 comprises a built-in microprocessor to cause processing of the input data from the sensors so as to determine a fuel injection amount (injection period) and an injection timing and outputs a drive pulse signal to the fuel injection valve 10 in accordance with the fuel injection amount and timing.

The microprocessor is mainly constituted by a central processing unit (CPU), input/output/I/O processing unit, and a memory, etc.

The sensors include a crank angle sensor 12, as known in the prior art, for providing an output signal at every 120° CA so that an engine speed can be detected by measuring the cycle of this signal.

The sensors also include a throttle sensor 13 provided at the throttle valve 9 which can actuate as the opening degree detection means for detecting the opening degree $\alpha$ of the throttle valve 9 by a built-in potentiometer.

A voltage is applied by a battery 15 to the control unit 11 as an activation power source of the unit 11, and for the detection of a main power source voltage VB for use in driving the engine.

An explanation will be given on a fuel injection control in accordance with the program held by the microprocessor of the control unit 11.

Figure 3:
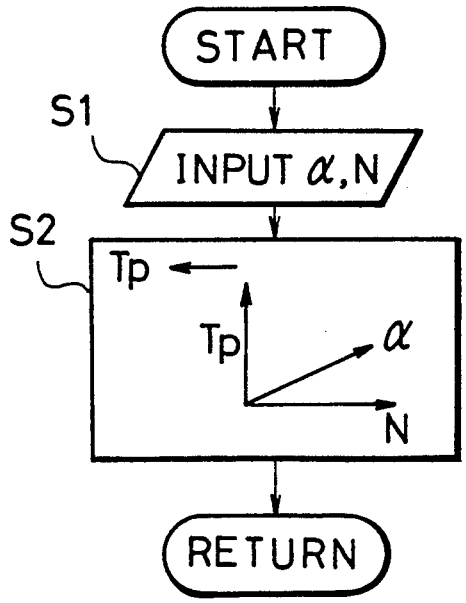
FIG. 3 is a flow chart showing the fuel control in the embodiment.

First, the normal or general fuel injection control will be explained on the basis of the flow chart of FIG. 3. The opening degree $\alpha$ of the throttle valve detected by the throttle sensor 13 and the engine speed N detected by the crank angle sensor 12 are input at Step 1 (hereunder, abbreviated to S1, as shown in the drawing). The opening degree $\alpha$ of the throttle valve may be understood as one aspect of a opening degree of an engine air intake passage or system. At Step 2, a basic fuel injection amount $T_P$ corresponding to the opening degree of the throttle valve $\alpha$ and the engine speed N input Step 1 are retrieved on a map, in which the basic fuel injection amount $T_P$ is previously stored at each engine operating region by the retrieval means in the control unit 11. The engine operating regions are formed by previously subdividing the whole area of the map in response to $\alpha$ and N and on each region the basic fuel injection amount $T_P$ is stored in response to the intake air volume to be sucked into cylinders. The retrieved $T_P$ is then set as the basic fuel injection amount $T_P$ commonly applicable to each cylinder.

The basic fuel injection amount $T_P$ retrieved from the map at Step 2 is compensated to the final standard fuel injection amount $T_I$ (corresponding to a standard fuel amount $T_I$ of the present invention) by providing a variety of compensatory factors (COEF) meeting the operating conditions of engine, such as the cooling water temperature and the like. Then a valve drive pulse signal having a pulse width corresponding to the standard fuel injection amount $T_I$ is output to each of the fuel injection valves 10 at the stipulated timing for injection the fuel.

Here, $TI = TP \times COEF + TS$

Incidentally, T$_P$X COEF corresponds to an effective injection amount. Te and T$_S$ stands for a correction component corresponding to the main power source of the engine.

Next, according to the present invention, when the engine is determined to be in a deceleration state, and further, the engine operating conditions are within an acceleratioen loss region, the fuel amount reduction rate BDG$_{LI}$ is set in response to the detected value of the engine speed N and the opening degree $\alpha$.

Figure 4:
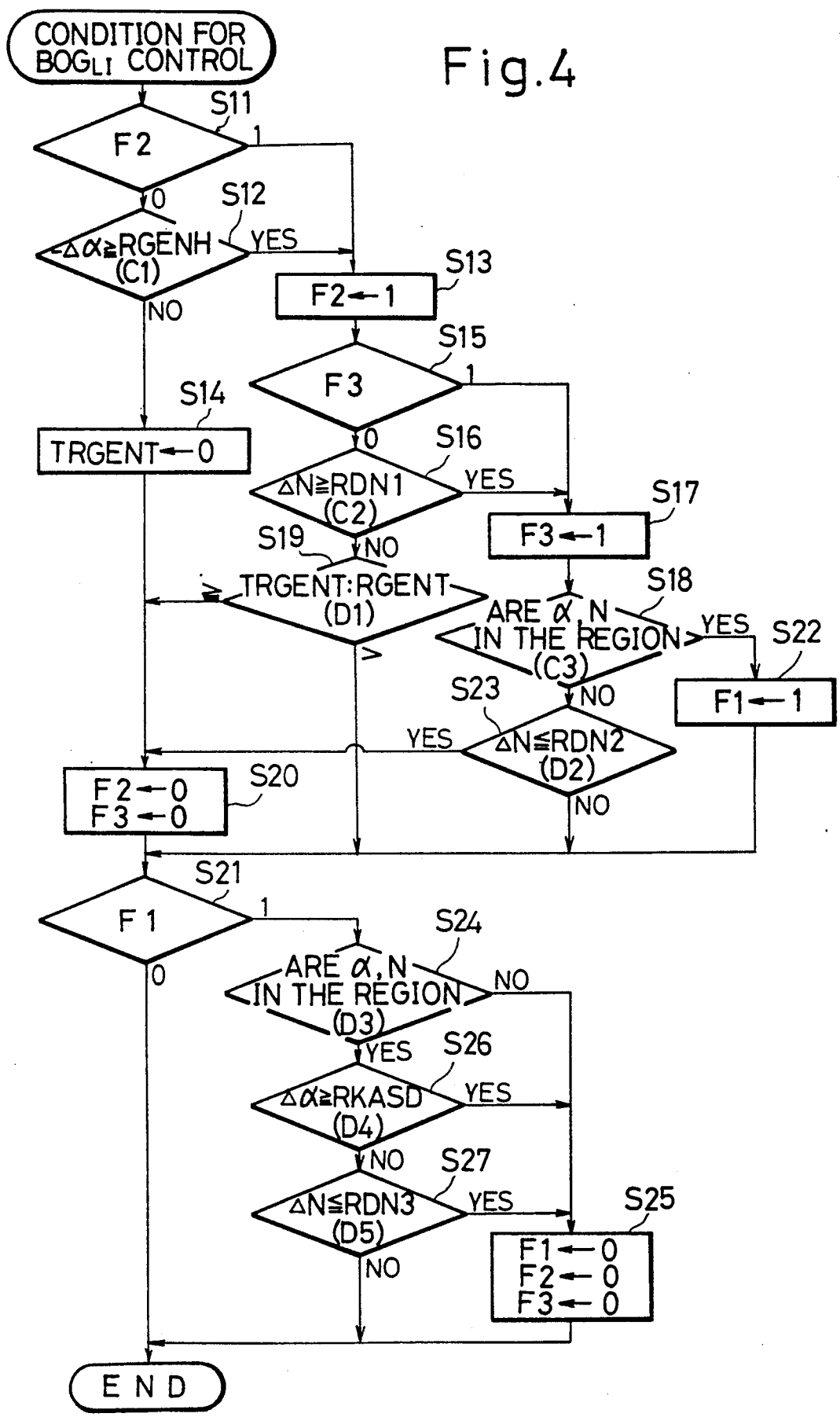
FIG. 4 is a flow chart showing the fuel control according to the present invention in the embodiment.

The control for setting the fuel amount reduction rate BDG$_{LI}$ will be explained with reference to a flow chart shown in FIG. 4 in compliance with a program set in the miucroporcessor in the control unit 11.

Here, at Step 11, a Flag 2 for teaching a change of the opening degree of the throttle valve is judged whether the change exceeds (1) a predetermined value or not (0). Ehen the Flag 2 is 0, the routine advances to Step 12, or when the Flag 2 is 1 then the routine goes to Step 13.

At step 12, a change of the opening degree of the throttle valve is decided by the determination of whether the change exceeds a predetermined value, which is the condition C1 for a deceleratigon control in accordance with the present invention, or not.

That is, at Step 12, $-\Delta\alpha$ (a bachge in the value of the opening degree of the throttle valve which will be computed in a subroutine shown in a drawing which will be explained later) > or = RGENH (a change in the value of the opening degree of the throttle valve for determining the deceleration operation of the engine) (constant). When $-\Delta$ > or = RGENH or the change in the value of the opening degree of the throttle valve is beyond or equal to the predetermined value, it is assumed that a driver for the engine has an intention to decrease the engine speed and then the controlling routine advances to Step 13 and the Flag 2 is set to 1. When the condition is $-\Delta\alpha$ < or = RGENH, that is when the change in the value of the opening degree of the throttle valve is less than the predetermined value, the routine goes to Step 14, then counting of a number of signals output from a timer commences after the number counted is reset to 0.

At Step 15, a Flag 3 for determining an immediate deceleration of the engine speed is judged and when the Flag 3 shows 0 then the routine goes to Step 16 or when the Flag shows 1 then the routine goes to Step 17.

At Step 16, whether or not the engine operation state, that is the condition (2) of a deceleration control of the engine in accordance with the present invention, is in an immediate deceleration state is determined. To be concrete, at Step 16, $\Delta$N (a change in the value of the engine speed to be computed in a subroutine which will be explained later) > or = RDN1 (a first change in the value of the engine speed for determining the deceleration of the engine speed) (constant) is judged. When $\Delta$N > or = RDN1, that is, when an immediate deceleration state of the actual engine speed is determined, the routine goes to Step 17 so as to set the Flag to 1. When $\Delta$N > RDN1, that is, when the engine operating state is not in the immediate deceleration state, the routine goes to Step 19.

At Step 19, the counted number TRGENT of signals from the timer is compared with a present value RGEND. When TRGENT > or = RGEND, that is, when the immediate deceleration state of the engine speed has not been determined at Step 16 in a present period of time after the determination of the intention of the deceleration in the engine speed, $-\Delta\alpha$ > or = RGENH, at Step 17, then the routine goes to Step 20 so that the Flag 2 and the Flag 3 are set to 0. In the case of TRGENT < RGEND, that is, when the counted number has not reached to the present value after the determination of $-\Delta\alpha$ > or = RGENH, the routine goes to 21 and is again returned to Step 11. In this regard, when the routine had passed through Step 20 in the preceding cycle, both determinations in Step 12 and Step 16 are not carried out after the control routine is returned to Step 11 since the Flag 2 and the Flag 3 have been set to 0. On the other hand, when the routine did not pass Step 20 in the preceding cycle routine, no determination in Step 12 and Step 16 is carried out after the control routine is returned to Step 11. In other words, when $\Delta$N > or = RDN1 has not been determined at Step 16 in the preset time period after the determination of $-\Delta$ > or = RGENH, the deceleration control of the present invention is cancelled so that condition shown in the Step 16 can be one of the cancellation conditions (D1) in accordance with the present invention. To determine the condition of $\Delta$N > or = RDNH1 in the present time period after the determination of $-\Delta\alpha$ > or = -RGENH is in the basis of consideration on a time leg of the change in the engine speed in response to a closing movement of the throttle valve.

Figure 5:
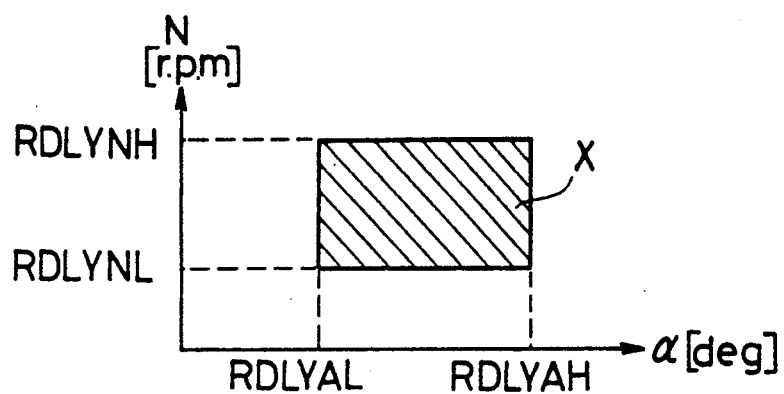
FIG. 5 is a graph showing the acceleration loss region in the embodiment.
Figure 6:
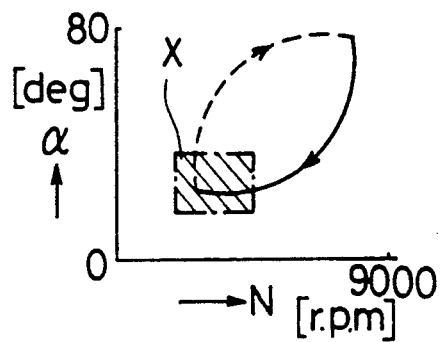
FIG. 6 is a graph explaining an acceleration loss region in the prior art.

While at Step 18, it is determined whether or not the deceleration control condition (C2) of the present invention is satisfied. The condition (C2) is that the opening degree $\alpha$ of the throttle valve and the engine speed N exists within the acceleration loss region X which is shown in FIG. 5 in a shaded portion. When the opening degree $\alpha$ of the throttle valve and the engine speed N are determined to be within the acceleration loss region X, the routine goes to Step 22 so that a Flag 1 for determining whether the opening degree of the throttle valve and the engine speed N exists within the acceleration loss region is set to 1 and then the routine goes into Step 21.

At Step 18, when the decision that the opening degree $\alpha$ of the throttle valve and the engine speed N do not exist in the region X is made, the routine goes to Step 23 and the condition of $\Delta$N < or = RDN2 (a second change in the value of the engine speed for determining a slow deceleration of the engine operation) (constant) is determined. When $\Delta$N < or = RDN2, the engine speed is determined to be in a slow deceleration of the engine speed then the routine goes to Step 20 and causes to cancel the deceleration control of the engine speed of the present invention. When the condition $\Delta$N > RDN2 is satisfied, that is in the case of the immediate deceleration of the engine speed operation, the routine goes into Step 21. This means that when the engine operation is determined to be in the slow deceleration engine operation state during the time period after the satisfaction of the condition of that the opening degree $\alpha$ of the throttle valve and the engine speed N exists in the acceleration loss region X in Step 18, again the routine returns to Step 11 and then the determination in Step 12 and Step 16 are carried out.

At Step 21, the determination of which value is provided in the Flag 2 is made.

When the conditions of $-\Delta\alpha$ > or = RGENH, $\Delta$N > or = RDN1 and the condition of that $\alpha$ and N are in the acceleration loss region X are satisfied in /rder in the determinations at Step 12, Step 16 and Step 18, it is judged that the conditions for the variable control (deceleration control) of Te in the deceleration state of the engine speed have been satisfied in order and then the variable control of Te in the deceleration state is carried out. The routine goes from Step 21 to Step 24.

While, when $-\Delta\alpha<\text{RGENH}$ is determined at Step 12, when $\Delta N<\text{RDN1}$ has been determined at Step 16 during the present time period after the determination of $-\Delta\alpha>\text{or}=\text{RGENH}$ or when the condition of that $\alpha$ and N are deviated from the acceleration loss region X is determined at Step 18 after the determination of $-\Delta\alpha>\text{or}=\text{RGENH}$ and $\Delta N>\text{or}=\text{RDN1}$, the variable control of Te in the deceleration of the engine speed is not carried out because the conditions for variable control of Te has not been satisfied in order and the Flag 1 maintains 0. Then the routine returns from Step 21 to Step 11 for commencing redeterminations on the routine from Step 11.

A determinations at Step 24 and a setting of Flags at S25 are carried out after the determination of the Flag 1 being 1 or after satisfaction of the condition of the variable control of Te in the deceleration state of the engine.

At Step 24, whether or not the opening degree $\alpha$ of the throttle valve and the engine speed N exist within the acceleration loss region X is determined. When $\alpha$ and N deviate from the region X after they once existed in the region X, and therefore a cancelling condition (D3) for cancelling the deceleration control of the engine is satisfied, the routine goes to Step 25.

When $\alpha$ and N are determined to be in the region X the routine goes to Step 26 and whether the change in the value of the opening degree of the throttle valve is larger than or equal to the predetermined value (a cancelling condition (D4) for cancelling the deceleration control is judged. That is, $\Delta\alpha>\text{or}=\text{RKASD}$ (the opening degree of the engine intake air system for determining the engine acceleration) (constant) is determined. When $\Delta\alpha>\text{or}=\text{RKASD}$ which means that the change in the value of the opening degree of the throttle valve is larger than or equal to the predetermined value, it is assumed that the driver has an intention to accelerate the engine speed and then the routine goes to Step 25 where the deceleration control is cancelled. On the other hand $\Delta\alpha<\text{RKASD}$ is satisfied, the routine goes to Step 27.

At Step 27, whether or not the actual engine speed is in the acceleration state is determined due to the change in the value of the engine speed, which means that $\Delta N<\text{or}=\text{RDN3}$ (a third change in the value of the engine speed for determining the engine acceleration operation) (constant) is determined. When $\Delta N<\text{RDN3}$ which means that the engine speed is in the acceleration state is determined, the routine goes to Step 25 where the deceleration control is canceled, while when $\Delta N>\text{RDN3}$ is determined which means that the engine speed is not in the acceleration operation state, the routine directly returns to Step 11.

At Step 25, the Flag 1, the Flag 2 and the Flag 3 are all reset to 0.

When the Flag 1 is reset to 0, the variable control of Te in the engine deceleration state is cancelled and the routine returns from Step 25 to Step 11. When the Flag 2 and the Flag 3 are reset to 0, the Te variable control conditions in the engine deceleration state are determined to be satisfied or not satisfied in order.

Incidentally note, that a certain time lag lies between Step 18 and Step 24 in the above-described flow chart.

Figure 7:
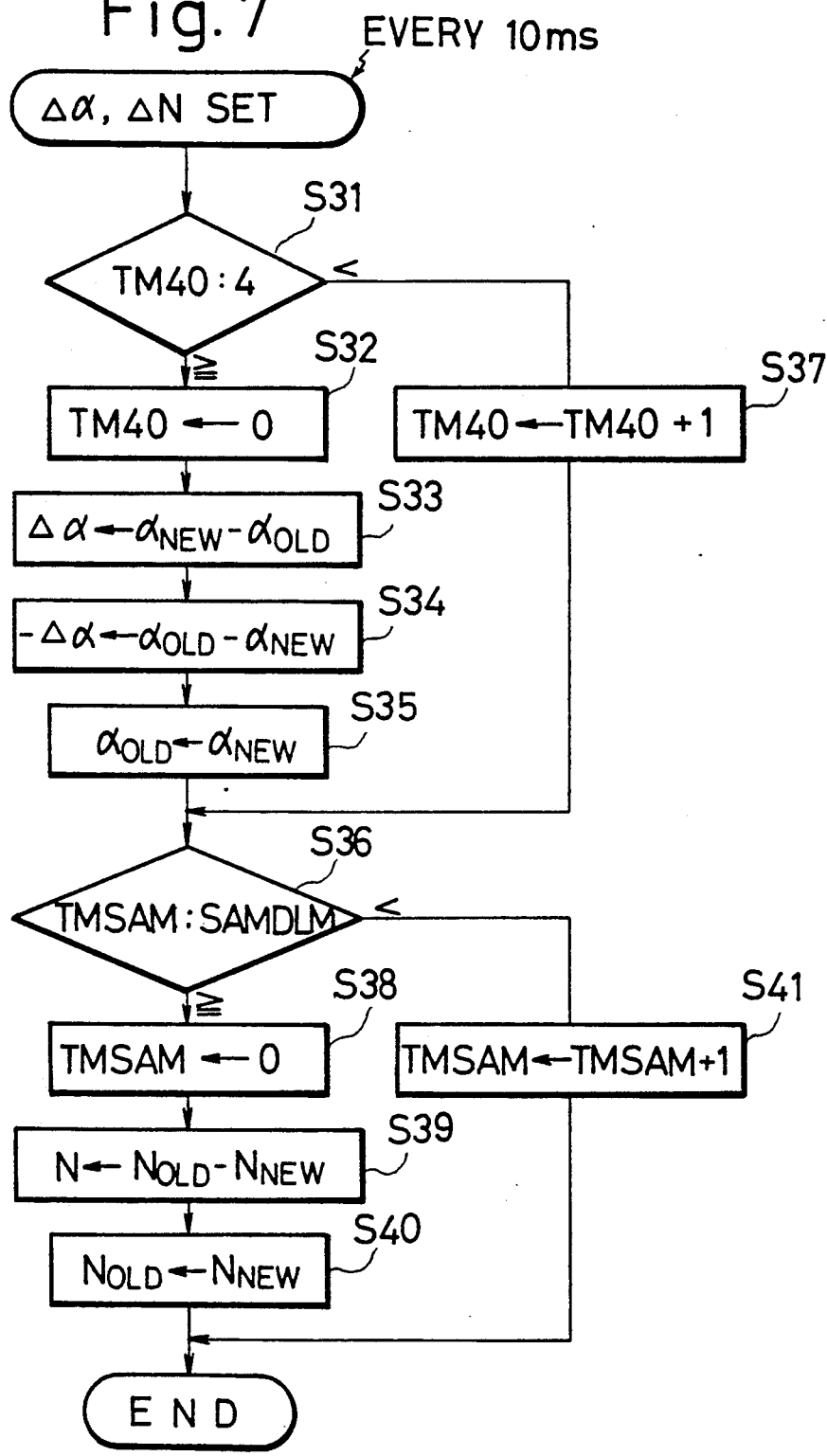
FIG. 7 is a flow chart showing a computing routine for computing reduction rates of an engine speed and an opening degree of an engine intake air system in the embodiment.
Figure 8:
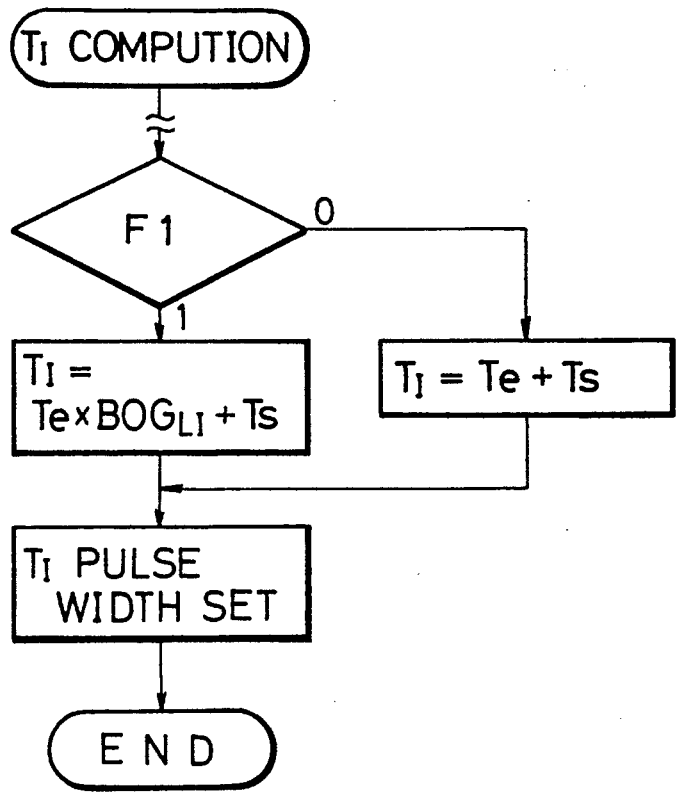
FIG. 8 is a flow chart showing a computing routine for computing a final standard fuel injection amount in the embodiment.

Next, back ground jobs for setting the changes $-\Delta\alpha$, $\Delta\alpha$ and $\Delta N$ in the values of the opening degree of the throttle valve or the engine speed described in the flow chart will be explained in a flow chart shown in FIG. 7.

This back ground jobs proceed every 10 ms.

A timer TM40 is provided for counting a time when $-\Delta\alpha$ and $-\Delta\alpha$ are computed every 40 ms. An actually counted number of outputs from the timer TM40 is compared at Step 31 with a preset number 4 (40 ms÷10 ms). When the number of outputs from the TM40$>$or$=$4, which means that it has past 40 ms since the last time of computing $-\Delta\alpha$ and $-\Delta\alpha$, the routine should advance to Step 32 where TM40 is reset to 0 so as to commence the counting of time. After that, the routine goes to Step 33 where $-\Delta\alpha=\alpha_{new}-\alpha_{old}$ is computed then goes to Step 34 where $-\Delta\alpha=\alpha_{old}-\alpha_{new}$ is computed and further goes to Step 35. At Step 35, $\alpha_{old}$ is renewed to $\alpha_{new}$ then the routine goes to Step 36.

The number of outputs from the TM40$<$4 is judged at Step 31 which means that it has not reached the period by 40 ms after the last counting time of $-\Delta\alpha$ and $\Delta\alpha$, the routine should advance to Step 37 where an additional number 1 is added to the last number of outputs from the TM40 and then the routine should go to Step 36.

A timer TMSAM is provided for counting a time when $\Delta N$ is computed. An actually counted number of outputs from the timer TMSAM is compared at Step 36 with a predetermined time number SAMDLN. When the number of outputs from the timer TMSAM$>$or$=$SAMDLN, which means that it has passed the predetermined period since the last time of computing $\Delta N$, the routine goes to Step 38. At Step 38, the set number of the Timer TMSAM is reset to 0 and the counting of time is restarted. At Step 39, $\Delta N=N_{old}-N_{new}$ is computed and at Step 40 $N_{old}$ is renewed to $N_{new}$.

The number of outputs from the timer TMSAM$<$SAMDLN is judged at Step 36, which means that it has not reached the predetermined period, the routine should go to Step 41 where an additional number 1 is added to the lastly counted number of outputs from the TMSAM.

In the above description, $\alpha_{old}$ stands for the opening degree prior to the time of 40 ms, $\alpha_{new}$ stands for the updated opening degree of the throttle valve. In addition, $N_{old}$ stands for the engine speed prior to the stipulated time and $N_{new}$ stands for the updated engine speed.

Here, the conditions for variable Te control in the engine deceleration which have been explained in the flow chart in FIG. 4 will be itemized as follows.

$-\Delta\alpha>\text{or}=\text{RGENH}$ (C1)

$-\Delta\alpha>\text{or}=\text{RDN1}$ (C2)

(C3) The opening degree $\alpha$ of the throttle valve and engine speed N exist in the acceleration loss region X shown in the shaded area in FIG. 5.

Incidentally the acceleration loss region can be predetermined by experiment.

The cancelling conditions for cancelling the variable Te control in the engine deceleration slate which were explained in the flow chart will be itemized as follows.

(D1) The condition of $\Delta N>\text{or}=\text{RDN1}$ has not been met within RGENT(sec) after the condition (C1) was satisfied.

(D2) The condition of $\Delta N\leq\text{RDN2}$ is satisfied during a time period before the condition (C3) is satisfied and after the condition (C2) was once satisfied.

(D3) The opening degree $\alpha$ of the throttle valve and the engine speed N deviate from the acceleration loss region X after all of the conditions (C1), (C2) and (C3) were once satisfied and the variable Te control has been carried out.

(D4) The condition of $\Delta\alpha > \text{or} = \text{RKASD}$ is satisfied after all of the conditions (C1), (C2) and (C3) were once satisfied and the variable Te control has been carried out.

(D5) The condition of $\Delta N < \text{or} = \text{RDN3}$ is satisfied after all of the conditions (C1), (C2) and (C3) were once satisfied and the variable Te control has been carried out.

Note, $\Delta\alpha$ = The updated opening degree of the throttle valve—The degree of opening of the throttle 40 ms previously (for determining an acceleration of the engine).

$-\Delta\alpha$ = The degree of opening of the throttle 40 ms previously—The updated opening degree of the throttle valve (for determining a deceleration of the engine).

$\Delta N$ = The engine speed at SAMDLN [sec] past—The updated engine speed (for determining the engine speed deceleration).

Figure 9:
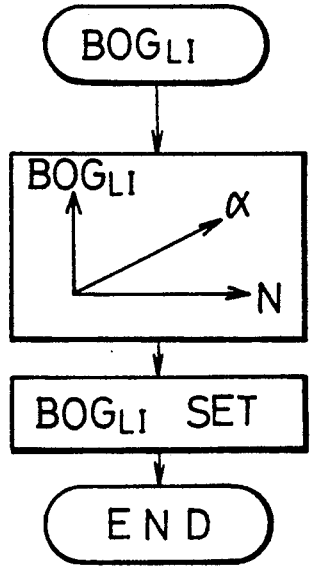
FIG. 9 is a flow chart showing a setting routine for setting a fuel amount reduction compensation coefficient in the embodiment.

When these variable control conditions have been satisfied, the fuel amount reduction compensation coefficient $BOG_{L1}$ is the value referred to with the addition of a compensation calculation, from the three-dimensional table by the opening degree of the throttle valve $\alpha$ and the engine speed N (see FIG. 9).

In the control routine for computing the final fuel injection amount T1, when the conditions of the reduction control for the fuel injection amount are satisfied in order so that the Flag 1 is set to 1, $T1 = Te \times BOG_{L1} + TS$ is computed. Each fuel injection valve 10 injects the fuel when the valve receives, every predetermined period of time, respective output signals for opening the valve by the pulse widths corresponding to the final fuel injection amount T1.

As described above, because the fuel amount reduction rate allocated by using $\alpha$ and N is added to the standard fuel injection amount predetermined by using $\alpha$ and N when the engine speed is within the acceleration loss region X and a deceleration of the engine determination is made, a smaller quantity of fuel is injected than the amount present in response to the degree of opening of the engine intake air system and the engine speed, when the engine is again accelerated after a deceleration thereof, and thus an excessive concentration of the air/fuel ratio can be prevented, misfiring of the engine is prevented, and an acceleration loss of the engine is also prevented.

We claim:

1. An electronic control fuel injection apparatus for a crank chamber compression type 2-cycle engine which comprises:
   a fuel injection valve,
   intake air volume control means for variably controlling an opening degree of an intake air system of the engine,
   detection means for detecting engine operating conditions including the opening degree of the engine intake air system which is controlled by the intake air volume control means and an engine speed,
   computing means for computing a deceleration rate of the engine speed and a change rate in the opening degree,
   first determination means for determining that the engine is decelerating in response to both of the rates,
   second determination means for determining whether or not the engine is operating within an acceleration loss region, which region is predetermined in response to the engine operating conditions during the determination of the deceleration of the engine,
   first setting means for setting a standard fuel injection amount in response to the detected engine speed and the opening degree of the intake air system,
   second setting means for setting a reduction rate of the fuel amount to be injected in response to the detected engine speed and the opening degree when the engine is determined to be decelerating by the first determination means, and when the engine operating conditions are determined to be within the acceleration loss region by the second determination means,
   third setting means for setting a fuel injection amount for a deceleration /f the engine by correcting the standard fuel injection amount set by said first setting means in response to the reduction rate of the fuel amount set by the second setting means, and
   fuel injection control means for driving and controlling the fuel injection valve in response to the fuel injection amount set by the first setting means or by the second setting means.

2. An electronic control fuel injection apparatus set forth in claim 1, wherein said intake air volume control means is a throttle valve variably controlling the degree of opening of an intake air passage.

3. An electronic control fuel injection apparatus set forth in claim 2, wherein the first setting means is constituted by memory means for storing basic fuel injection amounts for respective engine operating regions pre-classified into a plurality of numbers responsive to the opening degree of the intake air system and to the engine speed, retrieval means for retrieving the basic fuel injection amount in response to the actual opening degree of the engine intake air system and to the engine speed, standard fuel injection amount setting means for setting the retrieved basic fuel injection amount commonly applicable to all cylinders of the engine and fuel injection amount computing means for providing a variety of compensatory factors in response to the engine operating conditions to the previously set standard fuel injection amount and for computing the final standard fuel injection amount.

4. An electronic control fuel injection apparatus as set forth in claim 1, wherein the first determination means is constituted such that it can determine the engine speed deceleration state when both following conditions (C1) and (C2) have been satisfied in order.

(C1) (An opening degree of the system prior to a stipulated time—An updated opening degree of the system) $> \text{or} = $ A predetermined constant change rate in a value of the opening degree of the system for determining a deceleration of the engine and (C2) (The engine speed prior to the stipulated time—The updated engine speed) $> \text{or} = $ A predetermined constant change in a value of the engine speed for determining an engine speed deceleration.

5. An electronic control fuel injection apparatus as set forth in claim 4, wherein said second setting means is structured such that it can determine whether or not the following conditions (C3) is satisfied after satisfaction of the conditions (C1) then (C2)

(C3) When the engine speed N and the opening degree α of the engine air intake system are within the acceleration loss region X.

6. An electronic control fuel injection apparatus as set forth in claim 5, which further comprises cancellation conditions setting means for setting predetermined conditions for cancellation and cancellation means for canceling at least the setting of the reduction rate of the fuel amount set by the second setting means when the cancellation conditions are satisfied.

7. An electronic control fuel injection apparatus as set forth in claim 6 wherein said cancellation conditions include a condition where (An engine speed prior to the stipulated time—An updated engine speed)>or=A first change in the value (constant) of engine speed for determining the engine speed reduction have not been met within a stipulated time since the condition (C1) was satisfied.

8. An electronic control injection apparatus as set forth in claim 6 wherein said cancellation conditions include a condition where (An engine speed prior to the stipulated time—An updated engine speed)<or=A change in a constant value of the second engine speed RDN2 for determining the reduction of the engine speed has not been reached before the conditions (C3) are satisfied and after the conditions (C2) were once satisfied.

9. An electronic control injection apparatus as set forth in claim 6 wherein said cancellation conditions include a condition where an engine operating condition deviates from the acceleration loss region after all of the conditions of items (C1), (C2) and (C3) were once satisfied, the acceleration loss region being defined during the deceleration of the engine speed and a reacceleration after the deceleration being predetermined in response to the engine operating conditions.

10. An electronic control injection apparatus as set forth in claim 6 wherein said cancellation conditions include a condition where (An updated opening degree of the system—An opening degree of the system prior to the stipulated time)>or=An opening degree (constant) of the system for determining an engine acceleration are reached after all of the conditions in items (C1), (C2) and (C3) were once satisfied.

11. An electronic control injection apparatus as set forth in claim 6 7herein said cancellation conditions include a condition where (An engine speed prior to the stipulated time—An updated engine speed)<or=A third change in a value (constant) for determining the reduction of the engine speed are reached after all of the conditions in item (C1), (C2) and (C3) had been once satisfied.

12. An electric control injection apparatus as set forth in claim 1 wherein said second determination means is means for determining whether or not an actual opening degree of the engine intake air system and an actual engine speed exist within the region.

13. An electric control injection apparatus as set forth in claim 1 wherein the fuel reduction amount rate is made a value quoted, with an addition of a compensation calculation, by a three-dimensional table by the opening degree of the engine intake air system and the engine speed.

* * * * *